Feb. 28, 1933.  W. G. KIRCHHOFF  1,899,238
DOUGH DIVIDER
Filed July 19, 1930   2 Sheets-Sheet 1
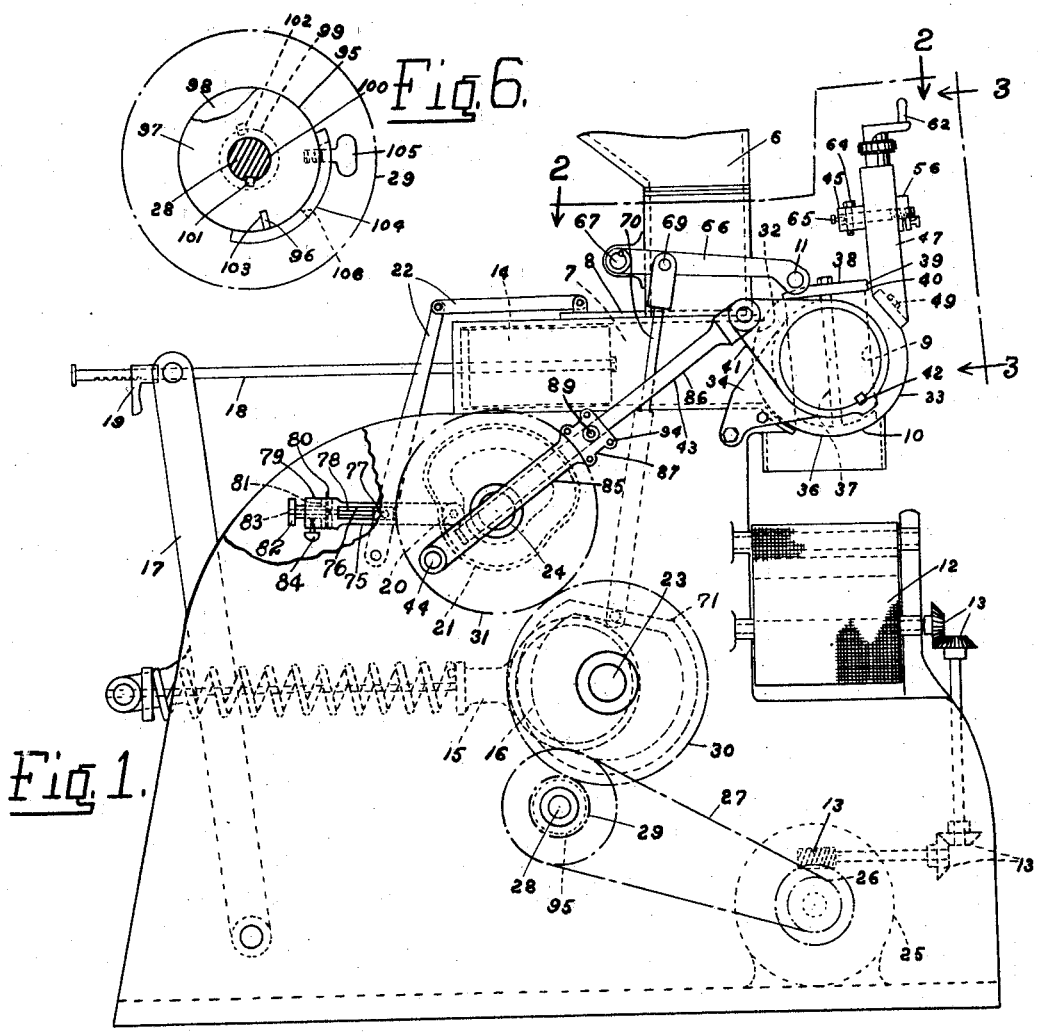
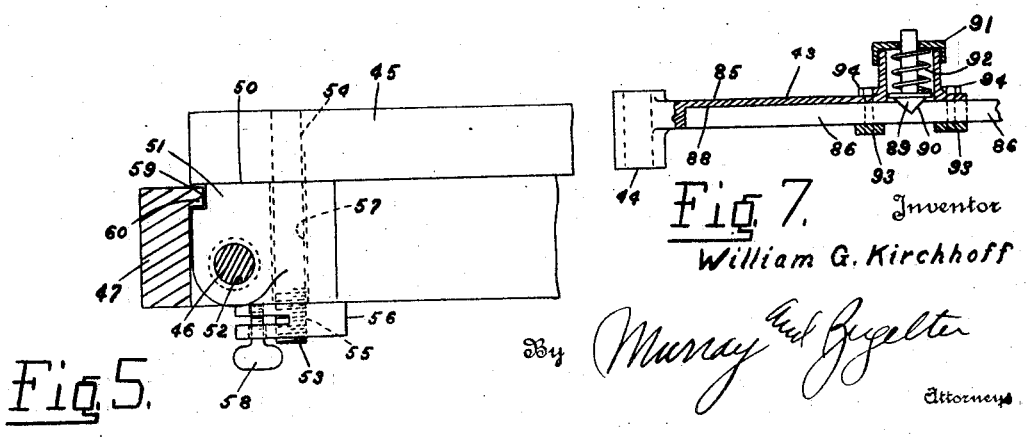
Inventor
William G. Kirchhoff
By Murray and Bugalter
Attorneys Feb. 28, 1933. W. G. KIRCHHOFF 1,899,238
DOUGH DIVIDER
Filed July 19, 1930 2 Sheets-Sheet 2
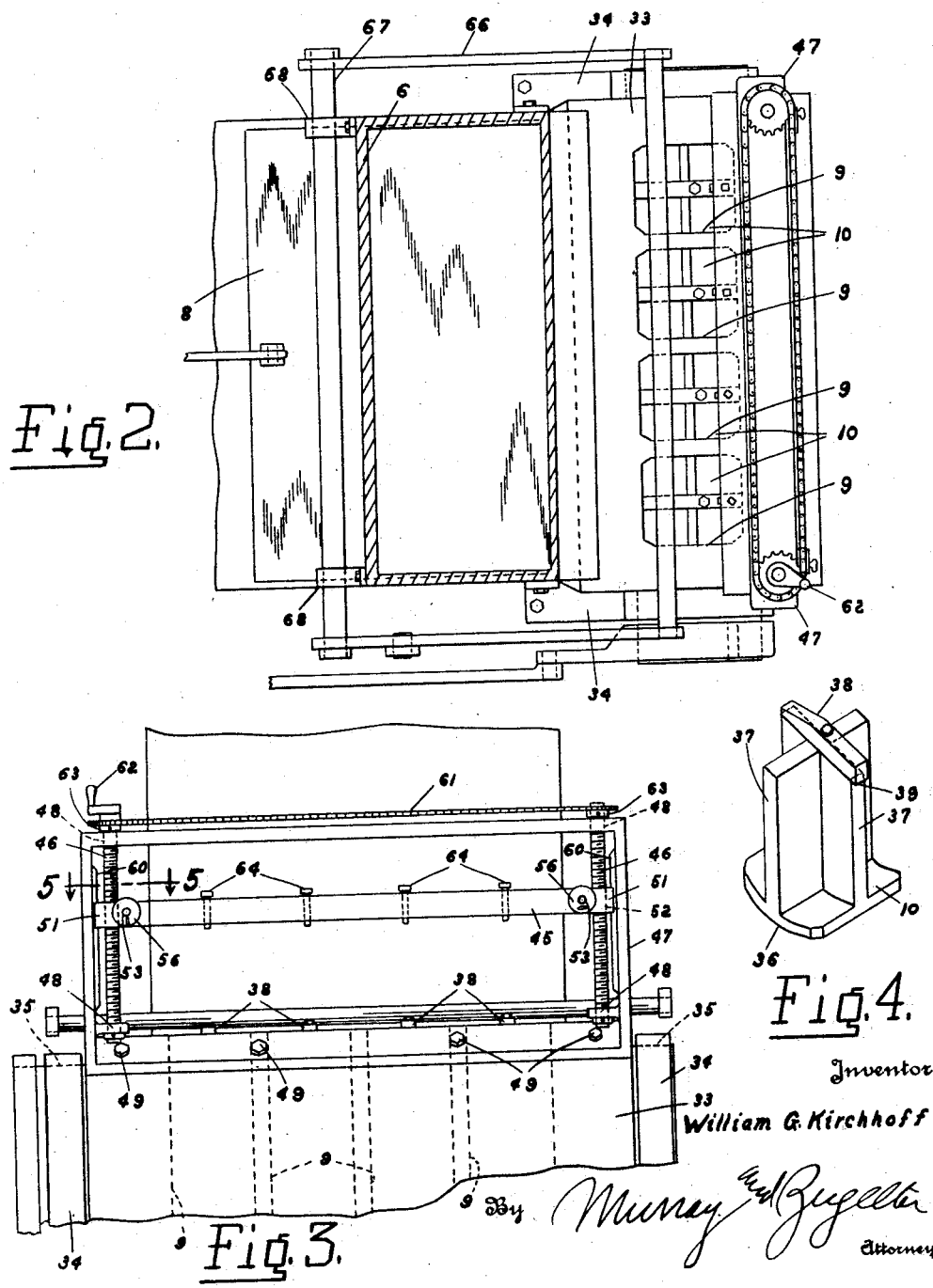

Patented Feb. 28, 1933

1,899,238

UNITED STATES PATENT OFFICE

WILLIAM G. KIRCHHOFF, OF CINCINNATI, OHIO, ASSIGNOR TO THE J. H. DAY COMPANY, OF CINCINNATI, OHIO, A CORPORATION OF OHIO

DOUGH DIVIDER

Application filed July 19, 1930. Serial No 469,199.

This invention relates to improvements in a dough divider of the general type disclosed in the patents to W. G. Kirchhoff, #1,217,778, and P. S. Ward, #1,229,188.

An object of the invention is to provide a dough divider having an improved dough measuring mechanism of great accuracy and extreme simplicity.

Another object is to provide a dough divider having a dough measuring mechanism which may be very accurately adjusted by simple means, to discharge dough lumps of uniform size.

Another object is to provide a device which may readily be disassembled for purposes of cleaning or parts replacement.

These and other objects are attained by the means described herein and disclosed in the accompanying drawings, in which:

Fig. 1 is a side elevational view of a dough divided embodying the invention.

Fig. 2 is a cross-sectional view taken on line 2—2 of Fig. 1.

Fig. 3 is an elevational view taken on line 3—3 of Fig. 1.

Fig. 4 is an isometric view of a plunger forming a detail of the invention.

Fig. 5 is a cross-sectional view taken on line 5—5 of Fig. 3.

Figs. 6 and 7 are cross-sectional views showing safety devices associated with the device of the invention.

The dough divided disclosed herein is of the same general type as that disclosed in the above mentioned Kirchhoff patent, wherein dough or other plastic material is fed from a hopper to a compression chamber where it is cut off by a knife-edged sliding cut off plate and subsequently rammed into one or more measuring chambers. The measuring chambers thereupon are emptied or discharged onto a conveyor or other suitable receiving means, by the action of individual plungers actuated in unison by a contact member operated by the driving mechanism of the machine. In the drawings, 6 represents the hopper, 7 the compression chamber, 8 the sliding cut off plate, 9 the measuring chambers, 10 the measuring chamber plungers, and 11 indicates the contact member. The receiving means, which may be a belt conveyor or the like is indicated at 12, and my be driven by any suitable means such as an arrangement of gears 13 operatively connected to a suitable source of power, for example the motor 25.

The ram 14, which is disposed within the compression chamber adjacent the cut off plate 8, may be reciprocated therein by means of a yieldable connecting rod 15 to which is imparted reciprocatory movement by a cam or other eccentric element 16. The movement of the rod 15 may be transmitted to the ram 14 by means of connecting members 17 and 18. This structure is disclosed in detail in the aforesaid Kirchhoff patent, but the means for reciprocating said ram is not to be limited to those set forth therein. The stroke of the ram may be varied by means of a stop handle 19 which may be disposed in various positions upon the notched rod 18. A simple means for reciprocating the cut off plate is indicated, 20 being a cam follower following a cam 21 and connected, by means of pivoted links 22, to the plate 8. The arrangement of the sliding plate with respect to the ram, is such that the plate will close the bottom of the hopper while the ram is advancing toward the measuring drum, the plate being moved to retracted position as the ram is retracted.

The shafts 23 and 24 which carry the cams or eccentric members 16 and 21, respectively, have their ends journaled in the frame of the machine, and said shafts are rotated by means of the motor 25. The motor may be provided with a sprocket 26 over which passes a chain 27 for engaging a sprocket on a drive shaft 28. Gears 29, 30 and 31 may be employed for rotating the shafts 23 and 24.

At the discharge end 32 of the pressure chamber 7 is supported an oscillating cylindrical drum or the like 33 in which are formed the diametrically disposed measuring chambers or pockets 10. The said chambers preferably are of uniform size and they extend in parallelism transversely of the drum, both ends thereof being open to permit unobstructed reciprocation of the plungers 10 therein. The drum may be supported for partial rotation transversely of the machine, by any suitable type of brackets 34 which receive the bearing portions 35 of the drum.

As shown in Fig. 4, each measuring chamber plunger comprises a curved head 36 which conforms with the curved outer surface of the drum when the plunger is extended. Extending from the head are a plurality of intersecting guides 37 which contact the inner walls of the measuring chamber, and one of the guides has bolted or otherwise secured to its free top surface a stop block 38. One or both of the free ends of the stop block overhangs the guide as indicated at 39. This extending end serves to limit the movement of the plunger into the plunger chamber, as it abuts the body of the drum at 40 (Fig. 1). In this position, the curved head 36 of the plunger coincides with the outer curved surface of the drum.

An arm 41 is fixed relative to the drum by any suitable means, such as a key 42, whereby the drum may be oscillated substantially ninety degrees to and from the discharge position indicated in Fig. 1. The free end of said arm has pivotally mounted thereon a connecting rod 43 which may be reciprocated by eccentrically mounting it relative to the shaft 24 as indicated at 44. Connection 44 may be a pivotal connection on the gear 31, if desired. It will be readily understood that upon each rotation of shaft 24, the drum will be moved, through an arc of approximately ninety degrees, from the discharge position shown, to the charge or receiving position and back to the discharge position. In the receiving position, each measuring chamber is disposed in alignment with the compression plunger or ram and its chamber 7. Plastic material forced into the measuring chambers by the ram will move the measuring chamber plungers 10 to a retracted position thereby filling said measuring chambers with plastic material or dough.

Means are provided for limiting the outward movement of the measuring plunger. Said means comprises a single adjustable stop bar 45 which is disposed in the path of movement of the plungers 10, and which extends longitudinally of the drum. The stop bar is supported near its opposite ends by mutually rotatable screws 46 which are journaled at 48 in a frame or support 47 fixed upon the drum by means of bolts or the like 49. Each end of the stop bar preferably is secured to a flat face 50 of a nut or internally threaded runner 51, the threaded bore 52 of which receives one of the screws 46. The means for thus securing the bar to the nut may be a threaded stud 53 one end 54 of which is anchored in the bar and the other end of which is threaded as at 55 to receive a locking nut 56. Said stud is freely received in a transverse bore 57 of nut 51. By tightening the nut upon the threaded stud and then locking it thereon by means of the thumb screw 58, the stop bar is securely fastened to the nut or runner. It will readily be understood that other types of lock nuts could be employed for the purpose. The nut or runner preferably is provided with a way or channel 59 for receiving a guide 60 of the frame piece 47.

Means are provided for rotating the screws 46 in unison, upon turning a crank or the like 62 which is fixed upon an end of one of the screws. Said means may be a chain 61 passing over sprockets 63, one of which is fixed upon each screw (Fig. 3). Upon actuating the crank 62, the stop bar may be raised or lowered relative to the drum and plungers 10. It should be clear from the foregoing that outward movement of the plungers causes the stop members 38 (Fig. 1) to strike the stop bar, thereby limiting the extent of plunger retraction and consequently the amount of plastic material that may enter the measuring chambers. Independent means are provided for individual adjustment of the plunger stroke. Said means comprises a screw 64 extending through the stop bar in the direction of plunger travel, said screw being locked by any suitable means such as a set screw 65. A screw such as 64 is disposed directly above each stop member 38, as indicated in Fig. 3.

Upon filling of the measuring chambers, and upon movement of the drum to the discharge position, shown in Fig. 1, it is necessary to move the retracted plungers 10 downwardly to the discharge position. The means for moving said plungers to effect discharge of the dough from the measuring chambers, comprises a contact bar 11 rigidly supported at its ends by a pair of arms 66, each of which has a free end thereof fixedly mounted upon a rock shaft 67. The rock shaft is mounted for rocking movement in a pair of brackets 68 supported by the machine frame. To one of the arms 66 is pivoted, as at 69, a connecting rod 70, the lower end of which cooperates with a cam or eccentric 71 fixed to the shaft 23. From the foregoing it will be readily apparent that rotation of shaft 23 will effect rocking of the shaft 67 and unitary oscillatory movement of the arms 66. Cam 71 is so positioned relative to shaft 23, that the contact member 11 will be elevated to an inoperative position upon movement of the drum into the dough receiving position. Upon movement of the drum into the discharge position indicated in Fig. 1, the arms 66 are actuated, thereby causing the contact member 11 to descend upon all of the contact members 38 of the plungers. The contact member 11 extends longitudinally of the drum 33 and serves as a common means for returning the plungers 10 to the initial or extended position.

The operation of the device is as follows. With reference to Fig. 1, it will be noted that the drum 33 is in the discharge position, that is, the contact member 11 is in abutment upon the stops 38, the plungers 10 being fully extended into the dough receptacles 9. Upon starting the machine from this position, the drum is rotated to the receiving position, at which time the ram 14 is advanced for forcing dough from the chamber 7 into the measuring chambers 9, thereby causing the plungers 10 to move outwardly until stopped by reason of the abutment of members 38 and 64. The position of bolts 64 determines the quantity of dough admitted to the measuring chambers. Cut off plate 8, it will be noted, is at this time in closed position relative to the bottom of the hopper, and contact member 11 has been moved to an elevated position. The cam 21 then operates to move the drum to the discharge position shown in Fig. 1, whereupon the plate 8 and ram 14 are retracted, the vacuum thereby formed being utilized to suck the dough from the hopper into chamber 7. At the same time, the contact member 11 is lowered, by the action of cam 71, to extend the plungers 10, thereby discharging the measured dough lumps upon the conveyor 12. Upon raising of the contact member and upon movement of the drum toward the receiving position, the plate 8 and ram 14 are advanced for repeating the operation.

It will be readily understood that the drum and all of the mechanism on frame 47 are moved bodily by the action of the eccentric means 21, and that by removing the two lock nuts 56 the bar 45 may easily be removed to permit removal of the plungers 10 without altering any of the adjustments.

Various driving elements of the machine are provided with means for precluding breakage of parts due to hardening of the dough, entry of foreign articles into the machine and possible seizing of the bearings. Attention is directed to the connecting rod 75 which, through members 22, actuates the cut off plate. This rod is provided with an elongated slot 76 in which is slidably mounted the bearing block 77 to which is pivotally connected the upright member 22. The block has fixed thereon a punch 78 which normally extends through a bored portion or housing 79, forming part of rod 75, and abuts a renewable sheet metal fracturable safety plate 80 which is received in a transverse slot 81 of the housing. Abutting the opposite face of the safety plate 80 is a hollow screw threaded stud 82, the bore 83 of which is of a size to receive the punch when it breaks through the safety plate because of strain on the cut off plate. To renew the safety plate, the thumb screw 84 is first loosened, whereupon the stud 82 may be unscrewed sufficiently to permit removal of the fractured safety plate from its slot 81. After inserting a new plate, the nut is drawn up tightly and locked by means of the thumb screw. It should be apparent from the foregoing that the slidable bearing will be permitted to reciprocate in slot 76 when the safety plate is fractured during operation of the machine.

The connecting rod 43 for actuating the drum is provided also with a safety device 87 (Fig. 7) which will permit relative longitudinal movement of the components 85 and 86 of the rod. Member 85 is provided with a longitudinal way 88 in which the member 86 may reciprocate upon application of sufficient strain to cause removal of the pointed spring urged safety pin 89 from the depression 90 in member 86. To re-set this safety device it is necessary only to loosen the perforated nut 91, thereby relieving the force of spring 92, and then to relatively move the members 85 and 86 for disposing the pin 89 within the depression 90. The nut 91 may then be tightened. A plate 93, upon which the member 86 may slide, is bolted or otherwise secured to member 85, as indicated at 94.

At 95 (Figs. 1 and 6) is shown a safety device for the main or drive shaft 28. This safety device is so constructed as to shear a safety key 96 of sheet metal, upon application of excessive resistance to rotation of any of the shafts 28, 23 or 24. For example, seizing of bearings for these shafts would cause shearing of the safety key. The safety device 95 comprises a pair of closely adjacent collars 97 and 98 one of which is mounted for rotation with a section 99 of the drive shaft which may rotate relative to an aligned section 100. The other collar is keyed or otherwise fixed to the section 99. As illustrated in the drawings, collar 97 is keyed at 101 to drive shaft section 100, and collar 98 is keyed at 102 to drive shaft section 99. Each collar is provided at its periphery with a slot or opening such as 103, which, when in registry or alignment, may receive a connecting safety key 96. A suitable guard 104 covers the slots 103 when the key is intact, thereby precluding its loss or removal. Upon application of great torsional strain to one section of the shaft, the other section will tend to twist, and the collars 97 and 98 thereupon will no longer tend to rotate in unison. As a result of the strain, the connecting key 96 will shear, thereby permitting free rotation of one collar relative to the other. The machine thereupon will stop though the motor continues to run. To renew the safety key, it is necessary only to loosen the thumb screw 105 whereupon the guard 104 may be removed, or slid by reason of the elongated slot 106 therein, to expose the key slots. The broken key may then be replaced by a new one and the guard positioned thereover as indicated in Fig. 6.

It is to be understood that various modifications and changes in structural details of the device may be made, within the scope of the appended claims, without departing from the spirit of the invention.

What is claimed is:

1. In a dough divider the combination of a chamber member rotatably mounted and movable to receiving and discharging positions and having a row of measuring chambers formed therein, reciprocable plungers in the measuring chambers, means for advancing a substance for entry into the measuring chambers as the plungers move to retracted positions while the chamber member is in the receiving position, means for moving the chamber member to the discharging position, a frame immovably secured to the chamber member and out of alignment with the path of movement of the plungers so as to offer no obstruction to removal of the plungers in the direction of the frame, and a readily removable stop bar adjustably mounted on the frame and overhanging a part of each plunger to provide for predetermined outward movement of the plungers and which bar may be removed bodily from its position on the frame for allowing ready removal and cleaning of the plungers.

2. In a dough divider the combination of a chamber member rotatably mounted and movable to receiving and discharging positions and having a row of measuring chambers formed therein, reciprocable plungers in the measuring chambers, means for advancing a substance for entry into the measuring chambers as the plungers move to retracted positions while the chamber member is in the receiving position, means for moving the chamber member to the discharging position, a frame immovably secured to the chamber member and out of alignment with the path of movement of the plungers so as to offer no obstruction to removal of the plungers in the direction of the frame, a runner guided for movement along the frame and adjusting means for fixing the location of the runner, a stop bar removably mounted upon the runner and overhanging a part of each plunger, individual adjusting means on the stop bar for contacting the said parts of the plungers whereby to limit outward movement of the plungers independently of one another, removal of the stop bar with its individual adjusting means serving to allow ready removal and cleaning of the plungers.

In testimony whereof, I have hereunto subscribed my name this 28th day of June, 1930.

WILLIAM G. KIRCHHOFF.